United States Patent [19]
Garenfeld et al.

[11] Patent Number: 5,312,419
[45] Date of Patent: May 17, 1994

[54] DEPILATION APPARATUS WITH TWISTING ACTION

[75] Inventors: Andreas J. Garenfeld; Rob Klasen; Marinus J. J. Dona, all of Eindhoven, Netherlands

[73] Assignee: U.S. Philips Corporation, New York, N.Y.

[21] Appl. No.: 993,265

[22] Filed: Dec. 18, 1992

[30] Foreign Application Priority Data

Dec. 23, 1991 [EP] European Pat. Off. ........ 91203380.0

[51] Int. Cl.$^5$ ..................... A45D 26/00; A22C 21/02
[52] U.S. Cl. .................... 606/133; 606/131; 69/26
[58] Field of Search ............. 19/2; 69/20, 26; 606/131, 133; 452/82, 84, 85; 30/34.2, 42, 46

[56] References Cited

U.S. PATENT DOCUMENTS

| | | |
|---|---|---|
| 1,875,980 | 9/1932 | Bingham . |
| 1,923,415 | 8/1933 | Bingham ................. 17/11 |
| 2,788,651 | 4/1957 | Qwarnstrom ............. 69/20 |
| 2,900,661 | 8/1959 | Schnell .................. 452/84 |
| 3,468,141 | 9/1969 | Soleanicov et al. ....... 69/20 |
| 3,608,153 | 9/1971 | Berrett ................. 69/20 X |
| 3,911,530 | 10/1975 | Kalfsbeck et al. ........ 17/11.1 |
| 4,079,741 | 3/1978 | Daar et al. ............. 128/355 |
| 4,279,253 | 7/1981 | Haes et al. ............. 128/355 |
| 4,575,902 | 3/1986 | Alazet .................. 19/2 |
| 4,726,375 | 2/1988 | Gross et al. ........... 128/355 |
| 4,807,624 | 2/1989 | Gross et al. ........... 128/355 |
| 4,830,004 | 5/1989 | Alazet ................. 128/355 |
| 4,935,024 | 6/1990 | Dolev .................. 606/133 |
| 5,100,413 | 3/1992 | Doley .................. 606/133 |
| 5,108,410 | 4/1992 | Iwasaki et al. ......... 606/133 |
| 5,112,342 | 5/1992 | Foerster et al. ........ 606/133 |
| 5,116,348 | 5/1992 | Gorter ................. 606/133 |
| 5,217,469 | 6/1993 | Dolev .................. 606/133 |

FOREIGN PATENT DOCUMENTS

| | | |
|---|---|---|
| 788130 | 10/1935 | France . |
| 9100700 | 1/1991 | PCT Int'l Appl. ......... 606/133 |
| 420470 | 12/1934 | United Kingdom . |
| 461572 | 2/1937 | United Kingdom . |

*Primary Examiner*—Clifford D. Crowder
*Assistant Examiner*—John J. Calvers
*Attorney, Agent, or Firm*—Ernestien C. Bartlett

[57] ABSTRACT

A depilation apparatus is provided with a depilation member (7) with pinching elements (19, 21, 69, 73, 111, 115) for consecutively holding hairs growing from the skin clamped in and pulling these hairs from the skin and comprises means (7, 41, 67) for twisting the hairs about their longitudinal axes before the depilation member (7) pulls the hairs from the skin whereby a considerable reduction of the required pulling force, a reduction of the pain occurring during pulling-out and a reduction of the risk of hair fracture during pulling-out of the hairs is obtained, the twisting action of the depilation apparatus being obtained through the use of a pair of disc-shaped pinching elements (19, 21, 69, 73, 111, 115) with cooperating pinching surfaces (23a, 23b, 71, 75, 113, 117) which slide alongside one another at least temporarily in the pinching position of the pinching elements (19, 21, 69, 73, 111, 115) and the pinching elements (19, 21, 69, 73, 111, 115) having different rotation speeds in the pinching position.

17 Claims, 7 Drawing Sheets

DEPILATION APPARATUS WITH TWISTING ACTION

FIELD OF THE INVENTION

The invention relates to a depilation apparatus provided with a depilation member having pinching elements for consecutively holding hairs which grow from the skin clamped in and pulling said hairs from the skin.

BACKGROUND OF THE INVENTION

A depilation apparatus of the kind mentioned in the opening paragraph is known from U.S. Pat. No. 4,575,902. The depilation member of the known depilation apparatus is provided with a number of pinching discs fastened on a drive shaft and a number of pinching plates arranged between the pinching discs and fastened on an auxiliary shaft which is coupled to the pinching discs so as to rotate along with them and which can be shifted parallel to the drive shaft. During rotation of the pinching discs, the pinching plates are clamped against the pinching discs through shifting of the auxiliary shaft, so that hairs present between the pinching discs and the pinching plates are held and pulled from the skin under rotation of the pinching discs and the pinching plates.

A disadvantage of the known depilation apparatus is that the process of pulling the hairs from the skin is a painful one.

SUMMARY OF THE INVENTION

An object of the invention is to provide a depilation apparatus of the kind mentioned in the opening paragraph by which the pain occurring while the hairs are being pulled from the skin is reduced to a considerable extent.

The depilation apparatus according to the invention is for this purpose characterized in that the depilation apparatus is provided with means for twisting the hairs about their longitudinal axes before the depilation member pulls the hairs from the skin. As a result of the use of the said means, the adhesion between the hair root and the hair follicle, from which the hair grows, and the adhesion between the hair and the capillary vesicle is already partly or entirely broken before the hair is pulled from the skin by the depilation member. A considerable reduction of the pulling force required is achieved in this way, so that pulling along of the skin during pulling out of the hair, which is experienced as unpleasant, is counteracted as much as possible, and a considerable reduction of the pain which occurs is achieved. Moreover, as a result of the reduction of the required pulling force, the risk of hair fracture during pulling out of the hairs is considerably reduced.

A special embodiment of the depilation apparatus according to the invention, by which an optimum reduction of the required pulling force and of the concomitant pain are achieved, is characterized in that the means for twisting the hairs twist the hairs at least five times fully about their longitudinal axes before the depilation member pulls the hairs from the skin.

A further embodiment of the depilation apparatus according to the invention, which provides a simple and compact construction of the depilation apparatus, is characterized in that the depilation member comprises the means for twisting the hairs.

A yet further embodiment of the depilation apparatus according to the invention, in which the depilation member comprises at least two pinching elements which are mutually displaceable from a catching position, in which a pinching surface of one of the pinching elements is at a distance from a pinching surface of the other pinching element, into a pinching position, in which the pinching elements exert a pinching force on one another through the pinching surfaces, is characterized in that the pinching surfaces of the pinching elements are slidable alongside one another in the pinching position. The sliding movement of the pinching surfaces alongside one another in the pinching position twists the hairs clamped in between the pinching surfaces in a practical and efficient manner.

A particular embodiment of the depilation apparatus according to the invention, in which the pinching elements are formed by disc-shaped pinching elements which are rotatable relative to a housing, which extend transverse to a depilation opening of the housing, and which are mutually displaceable from the catching position into the pinching position, is characterized in that the disc-shaped pinching elements have different rotation speeds at least temporarily while in the pinching position. The use of the different rotation speeds achieves in a simple manner that the pinching surfaces of the pinching elements slide alongside one another in the pinching position, so that the hairs present between the pinching surfaces are twisted before being pulled out.

A further embodiment of the depilation apparatus according to the invention is characterized in that one of the pinching elements is fastened on a drive shaft which is journalled so as to be rotatable relative to the housing and which is shiftable in axial direction, while the other pinching element is journalled so as to be freely rotatable relative to the housing. In this embodiment, in which a temporary difference between the rotation speeds of the disc-shaped pinching elements is provided in a simple manner, the pinching elements enter the pinching position owing to a shifting movement of the drive shaft. The rotation speeds of the pinching elements are temporarily different after reaching the pinching position when the pinching element fastened on the drive shaft causes the pinching element journalled freely relative to the housing to rotate.

It is noted that European Patent Application EP-A1-0,408,038 discloses a depilation apparatus with two pinching elements in which one of the pinching elements is driven by an electric motor, while the other pinching element is journalled so as to be rotatable relative to a housing of the depilation apparatus. The description and the Figures of this Patent Application, however, do not provide the slightest indication as to the rotation speed of the pinching element journalled so as to be rotatable relative to the housing.

A yet further embodiment of the depilation apparatus according to the invention is characterized in that the pinching element journalled so as to be freely rotatable relative to the housing is cup-shaped and is elastically deformable in axial direction. The use of the cup-shaped and elastically deformable pinching element leads to a gradual build-up of the pinching force between the pinching elements after reaching the pinching position, so that a gradual build-up of the rotation speed of the pinching element journalled so as to be freely rotatable relative to the housing is achieved, and the hairs are twisted a sufficient number of times about their longitudinal axes.

A special embodiment of the depilation apparatus according to the invention, in which a predetermined speed difference between the disc-shaped pinching elements is present, is characterized in that one of the pinching elements is fastened on a first drive shaft, while the other pinching element is fastened on a second drive shaft which is arranged coaxially with first drive shaft, one of the two drive shafts being shiftable in axial direction, while the drive shafts can be driven at different speeds.

A further embodiment of the depilation apparatus according to the invention, which has a simple and practical construction, is characterized in that the two drive shafts can be driven by means of only one electric motor.

A yet further embodiment of the depilation apparatus according to the invention, in which the pinching elements are formed by pinching discs which are rotatable relative to a housing, is characterized in that the two pinching discs have noncoaxial rotation axes and are in engagement with one another by means of surfaces which are undulated in circumferential direction, having different numbers of undulations, while one of the two pinching discs can be driven. Only one of the pinching discs is driven in this embodiment of the depilation apparatus, a permanent speed difference between the pinching discs being achieved, defined by the difference between the numbers of undulations of the surfaces of the two pinching discs.

A particular embodiment of the depilation apparatus according to the invention, in which a speed difference is achieved between the pinching discs sufficient for twisting the hairs at least five times fully about their longitudinal axes, is characterized in that one of the two pinching discs has only one undulation more than the other pinching disc.

A further embodiment of the depilation apparatus according to the invention, in which the depilation member comprises at least two disc-shaped pinching elements which are rotatable relative to a housing, which extend transverse to a depilation opening of the housing, and which are mutually displaceable from a catching position, in which a pinching surface of one of the pinching elements lies at a distance from a pinching surface of the other pinching element, into a pinching position, in which the pinching elements exert a pinching force on one another through the pinching surfaces, is characterized in that one of the pinching elements is fastened on a drive shaft which is rotatably journalled relative to the housing and is shiftable in axial direction, while the other pinching element is journalled so as to be freely rotatable relative to the housing, the means for twisting the hairs comprising an auxiliary disc which can be driven, which is arranged parallel to the disc-shaped pinching elements, and which is displaceable relative to the freely rotatable pinching element and temporarily bears on the freely rotatable pinching element in the pinching position of the pinching elements. Owing to the said auxiliary disc, the freely rotatable pinching element can be driven in the pinching position at a rotation speed different from that of the other pinching element during a predetermined time, and hairs can be twisted a desired number of times about their longitudinal axes before being pulled out.

A yet further embodiment of the depilation apparatus according to the invention, which provides a simple and compact drive for the auxiliary disc, is characterized in that the auxiliary disc is fastened on an auxiliary shaft which is directed parallel to the drive shaft and is shiftable in axial direction in synchronity with the drive shaft.

BRIEF DESCRIPTION OF THE DRAWING

The invention will be explained in more detail below with reference to a drawing in which.

DETAILED DESCRIPTION OF PREFERRED EMBODIMENTS

Figure 1:
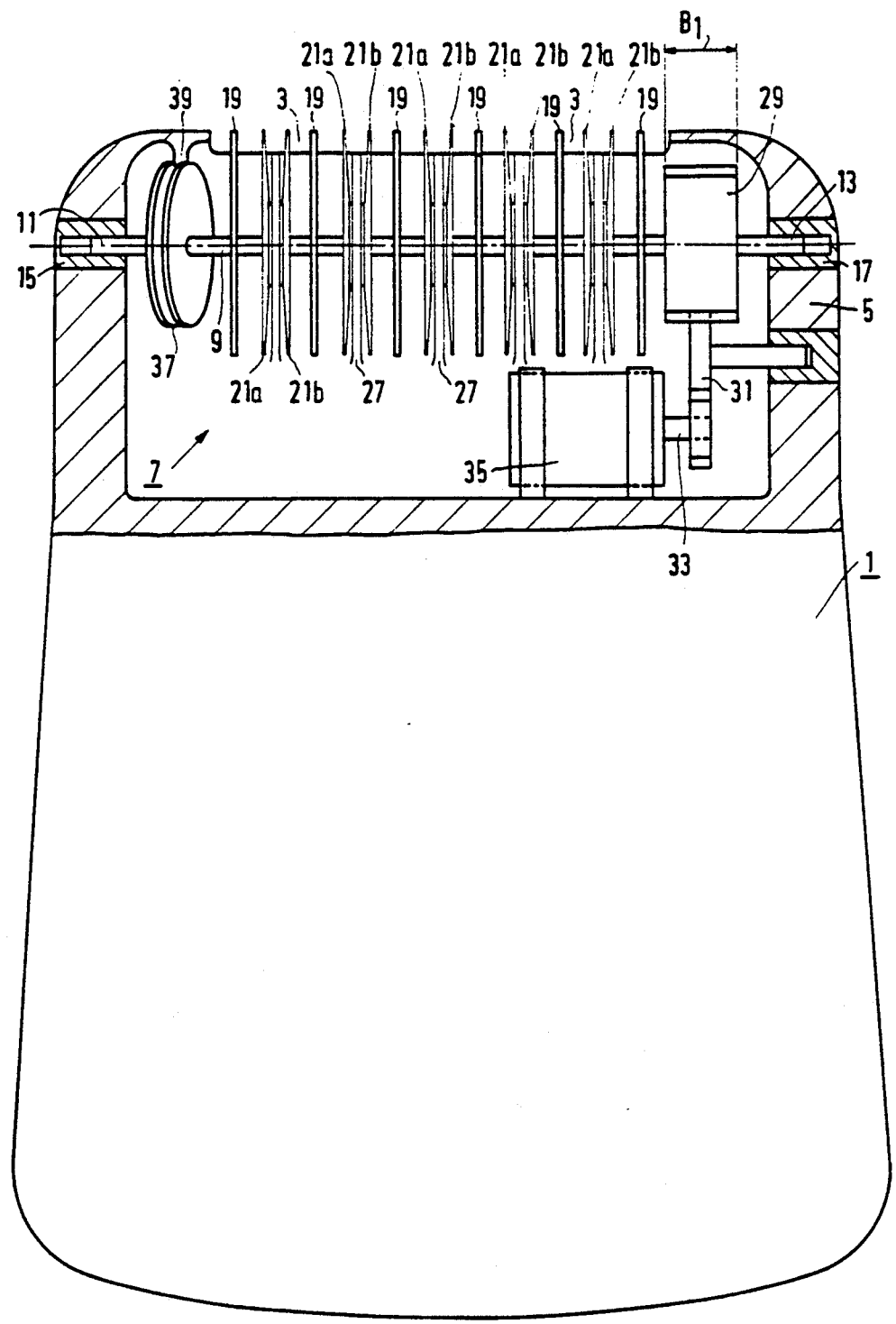
FIG. 1 shows a first embodiment of a depilation apparatus according to the invention partly in side elevation and partly in cross-section.
Figure 2A:
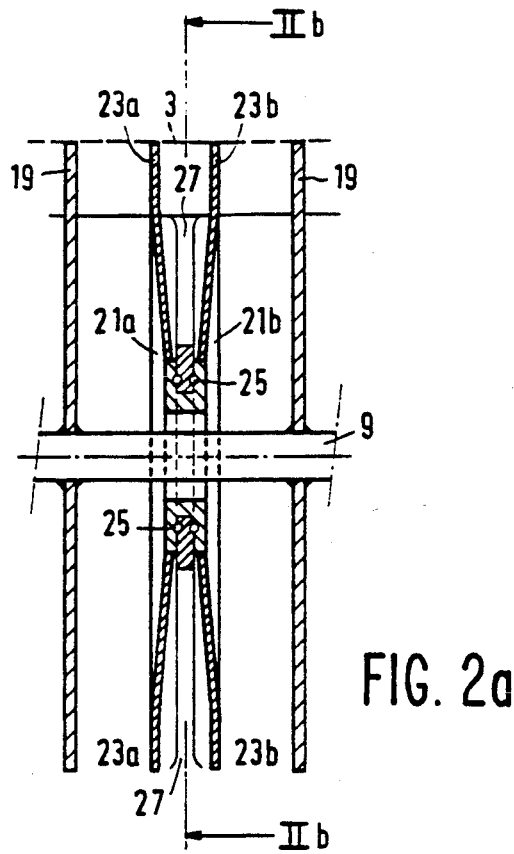
FIG. 2a is a detailed cross-section of a few pinching discs of the depilation apparatus of FIG. 1.
Figure 2B:
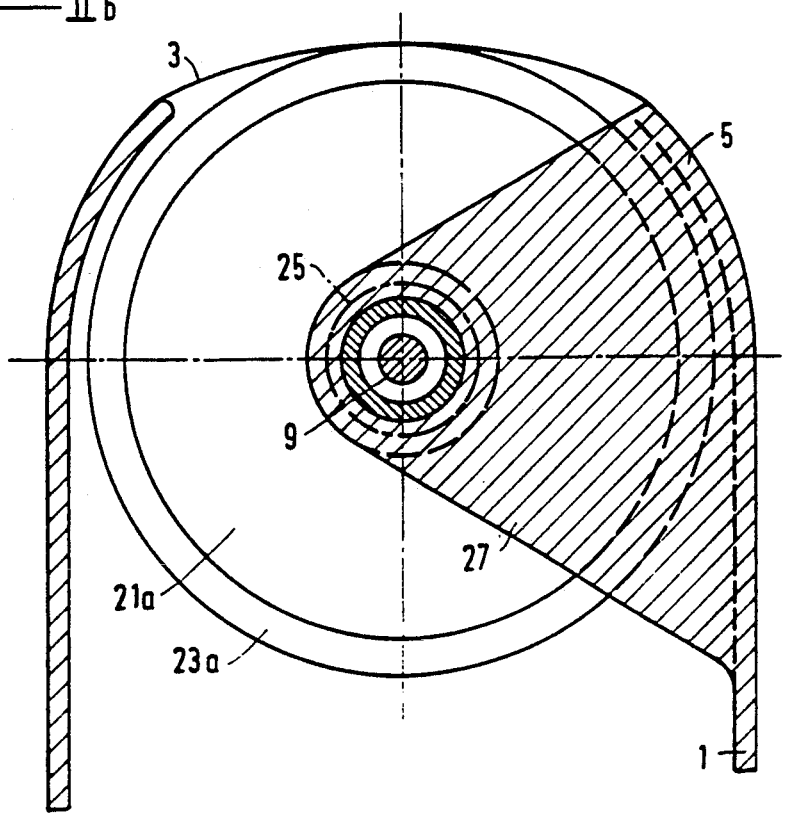
FIG. 2b is a cross-section of the depilation apparatus taken on the line IIb—IIb in FIG. 2a, FIG. 3 diagrammatically shows how a hair is twisted between two pinching discs of the depilation apparatus of FIG. 1.
Figure 3:
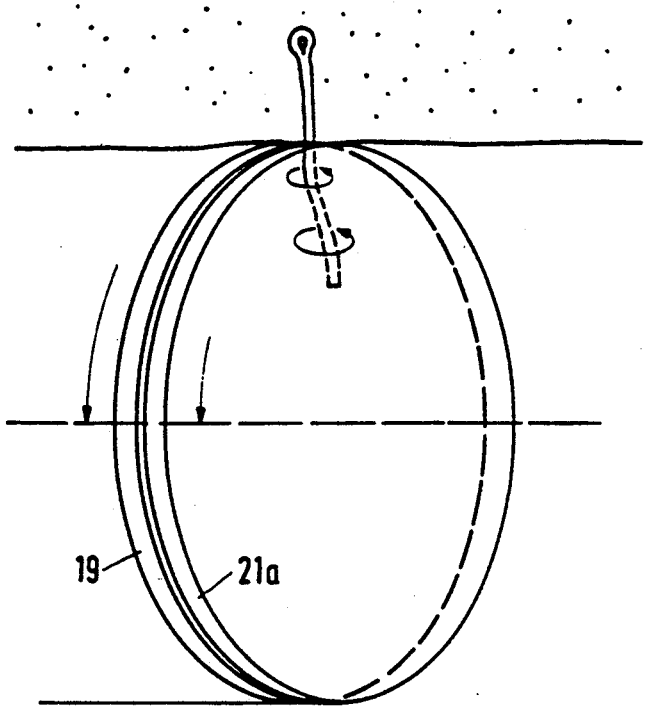

The first embodiment of the depilation apparatus according to the invention shown in FIGS. 1 to 3 is provided with a housing 1 having a depilation opening 3 which is provided in a depilation head 5 of the housing 1. A depilation member 7, to which the skin to be depilated can be exposed through the depilation opening 3, is present in the depilation head 5.

As FIG. 1 shows, the depilation member 7 is provided with a metal drive shaft 9 arranged parallel to the depilation opening 3 and having its rotation bearings with journals 11 and 13 in bearing bushes 15 and 17 of the depilation head 5. A number of rigid pinching discs 19 made of metal is fastened on the drive shaft 9, extending transverse to the drive shaft 9 and the depilation opening 3. The depilation member 7 further comprises a number of pairs of cup-shaped pinching discs 21a, 21b which are made of metal, which are flexible in axial direction, which are arranged between the rigid pinching discs 19, and which, as FIG. 2b shows, are provided with annular pinching surfaces 23a, 23b. As is shown in detail in FIGS. 2a and 2b, each pair of pinching discs 21a, 21b is fastened to a ball bearing 25 common to the pair by means of which the pair of pinching discs 21a, 21b is rotatably supported in a bearing support 27 of the depilation head 5.

FIG. 1 further shows that the drive shaft 9 is provided with a gearwheel 29 which is coupled to an output shaft 33 of an electric motor 35 via an intermediate gear 31. Furthermore, a guide disc 37 is fastened on the drive shaft 9, arranged obliquely relative to the drive shaft 9 and in engagement with a guide pin 39 fastened to the housing 1. Owing to the use of the guide disc 37 and the guide pin 39, the drive shaft 9 driven by the electric motor 35 performs a combined rotary and translatory movement during operation, whereby the journals 11, 13 slide in the bearing bushes 15, 17 in axial direction. The stroke of the translatory movement of the drive shaft 9 is a function of the obliqueness of the guide disc 37 relative to the drive shaft 9. The width $B_1$ of the gearwheel 29 indicated in FIG. 1 is such that the gearwheel 29 remains in engagement with the intermediate gear 31 over the entire stroke of the drive shaft 9.

In the central position of the depilation member 7 depicted in FIGS. 1 and 2a, the pinching discs 21a, 21b clear the pinching discs 19 driven into rotation by the electric motor 35, and a hair trapping slot which hairs present in the depilation opening 3 can enter (catching position of the pinching discs 19, 21a, 21b) is present between the pinching discs 19 and the pinching surfaces 23a of the pinching discs 21a, and between the pinching discs 19 and the pinching surfaces 23b of the pinching discs 21b. The pinching discs 21a, 21b usually do not perform a rotary movement in the catching position.

Starting from the central position depicted in FIGS. 1 and 2a, a further rotation and translation of the drive shaft 9 brings the pinching discs 19 into contact with the pinching surfaces 23a of the pinching discs 21a, after which a pinching force is built up between the pinching discs 19 and the pinching surfaces 23a under elastic deformation of the pinching discs 21a. The difference between the rotation speeds of the pinching discs 19 and 21a is at its maximum at the moment at which the pinching discs 19 come into contact with the pinching discs 21a. The difference between these rotation speeds is eliminated over a short period because the pinching discs 21a are taken along in rotation by the pinching discs 19 upon a further rotation and translation of the drive shaft 9. During the short period in which there is a difference in speed between the pinching discs 19 and 21a, the hairs present between the pinching discs 19 and the pinching surfaces 23a are twisted about their longitudinal axes a few times. Twisting of the hairs between the pinching discs 19 and 21a is shown diagrammatically in FIG. 3. When the drive shaft 9 reaches the end of its stroke in axial direction, the pinching force between the pinching discs 19 and the pinching surfaces 23a reaches a maximum value and the twisted hairs present between the pinching discs 19 and the pinching surfaces 23a are pulled from the skin by the rotation of the drive shaft 9. The pinching discs 21a subsequently become clear of the pinching discs 19 again, upon which the pinching discs 21a come to a standstill within a short period owing to friction in the ball bearings 25. The process described above is repeated when the pinching discs 19 subsequently come into contact with the pinching discs 21b.

The above description makes clear that the hairs clamped between the pinching discs 19 and 21a, 21b are twisted about their longitudinal axes before being pulled from the skin. Twisting of the hairs breaks the adhesion between the hair roots and the hair follicles from which the hairs grow, and the adhesion between the hairs and the capillary vesicles partly or completely. The force necessary for pulling the hairs from the hair follicles and the capillary vesicles is considerably reduced by this. As a result, on the one hand the skin is pulled along less far during pulling out of the hairs, so that the depilation is much less painful. On the other hand, the risk of hair fracture during pulling out of the hairs, which means that the hair root remains in the follicle and the hair will continue to grow, is considerably reduced, so that the depilation apparatus gives a good depilation result. It is noted that tests have shown that twisting of the hairs in itself does not cause any particular pain sensations.

Experiments have shown that the required pulling force is substantially halved if the hairs are twisted at least five times fully about their longitudinal axes before being pulled out. The number of times the hairs are twisted is determined in the depilation apparatus according to the first embodiment by the axial bending stiffness of the pinching discs 21a and 21b and the axial stroke of the pinching discs 19. In the case of a small axial bending stiffness of the pinching discs 21a, 21b, a comparatively small pinching force is built up in the pinching position, but a speed difference between the pinching discs 19 and the pinching discs 21a, 21b remains present in the pinching position for a relatively long period, so that the hairs are twisted about their longitudinal axes a large number of times. It is possible to optimize the relation between the pinching force and the number of times the hairs are twisted by means of a favorable choice of the axial bending stiffness of the pinching discs 21a, 21b. The use of the pinching discs which are flexible in axial direction in addition achieves that the operation of the depilation apparatus is hardly affected by dimensional inaccuracies and tolerances arising during manufacture of the depilation apparatus.

Figure 6A:
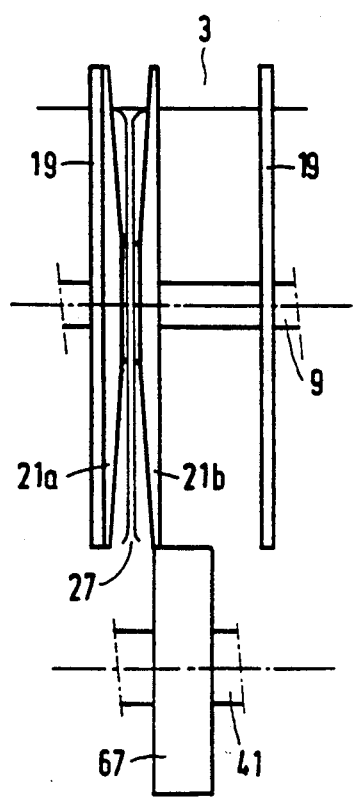
Figure 6B:
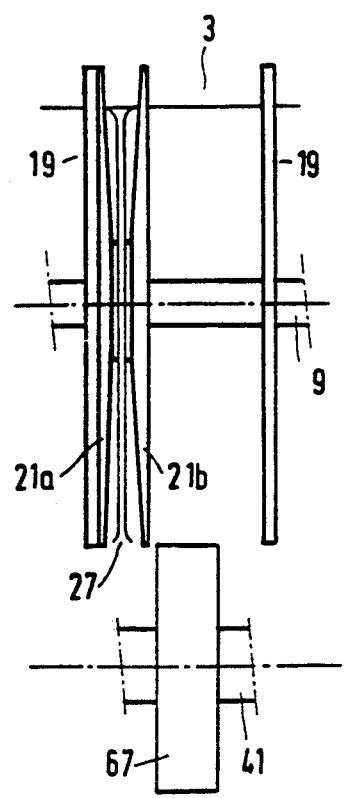

The embodiment of the depilation apparatus shown in FIGS. 1 to 3 has a depilation member 7 which incorporates the means for twisting the hairs, so that a compact construction of the depilation head 5 is obtained. As will be clear from the following description, further means for twisting the hairs in addition to the depilation member 7 are provided in the second embodiment of the depilation apparatus shown in FIGS. 4 to 6.

Figure 4:
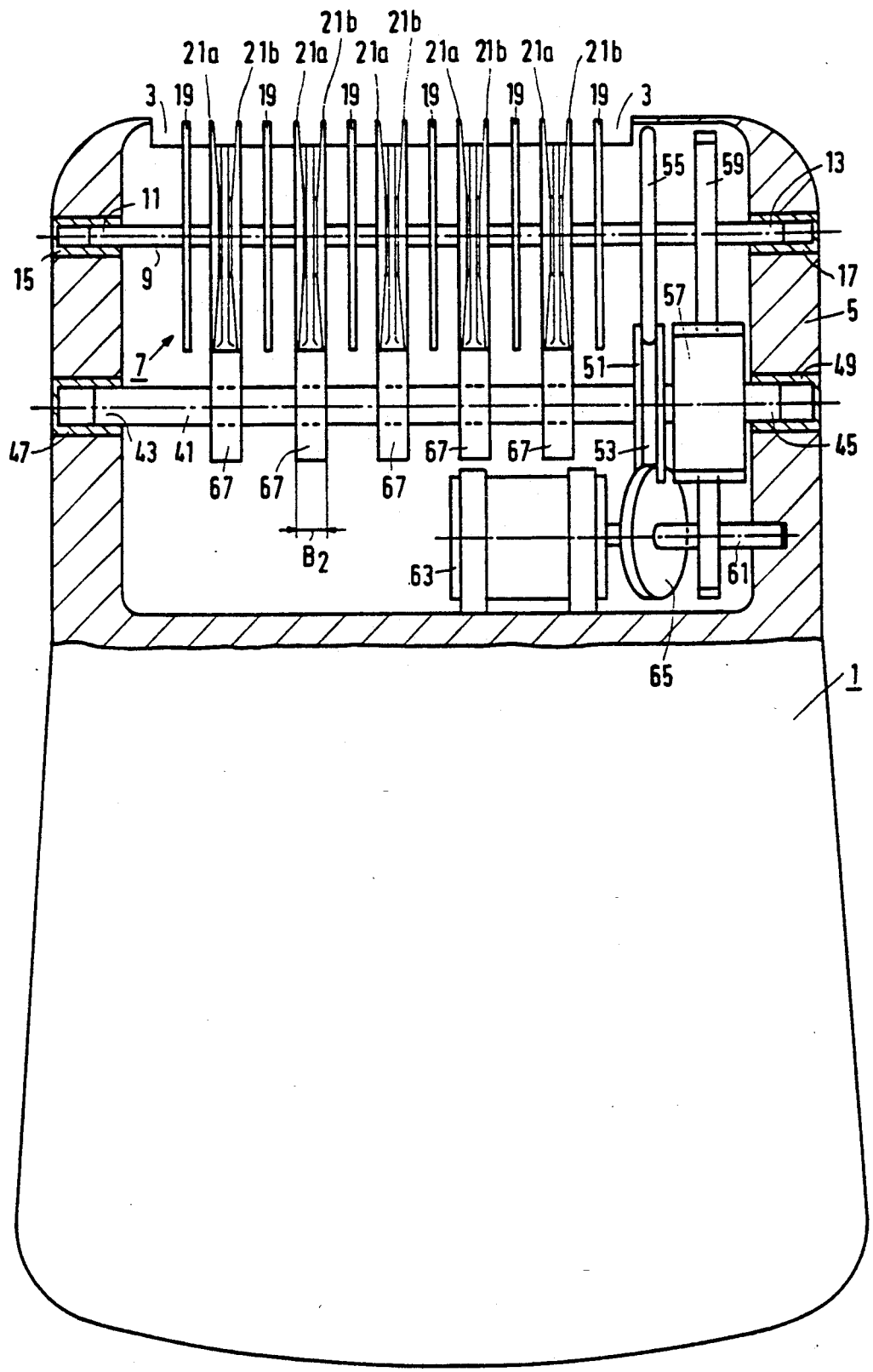
FIG. 4 shows a second embodiment of a depilation apparatus according to the invention, partly in side elevation and partly in cross-section.

The depilation apparatus depicted in FIGS. 4 to 6 also comprises a housing 1 with a depilation opening 3 provided in a depilation head 5, through which opening the skin to be depilated is exposed to a depilation member 7. The depilation member 7 is partly identical to the depilation member 7 of the first embodiment shown in FIGS. 1 to 3, so that only the differing characteristics will be discussed below.

The second embodiment of the depilation apparatus comprises in addition to the depilation member 7 a metal auxiliary shaft 41 which is arranged parallel to the drive shaft 9 and which is rotatably supported with journals 43 and 45 in bearing bushes 47 and 49 of the depilation head 5 so as to be movable also in axial direction. The auxiliary shaft 41 has a guide disc 51 with an annular groove 53 which is provided in a plane transverse to the auxiliary shaft 41 and the drive shaft 9. The guide disc 51 is in engagement, by means of the groove 53, with a coupling disc 55 which is mounted on the drive shaft 9, which extends perpendicular to the drive shaft 9, and by means of which the drive shaft 9 is coupled to the auxiliary shaft 41 in axial direction. Furthermore, the auxiliary shaft 41 is provided with a gearwheel 57 which on the one hand is in engagement with a gearwheel 59 of the drive shaft 9 and on the other hand is coupled to an output shaft 61 of an electric motor 63. On the output shaft 61 is also fastened a guide disc 65 which is arranged obliquely relative to the output shaft 61 and is in engagement with the guide disc 51 of the auxiliary shaft 41. Owing to the use of the coupling disc 55 and the guide disc 65, the drive shaft 9 and the auxiliary shaft 41 perform combined rotary and translatory movements, the translatory movements taking place in synchronity.

As FIG. 4 shows, the auxiliary shaft 41 has an auxiliary disc 67 made of a synthetic rubber for each pair of pinching discs 21a, 21b. In the central position of the depilation member 7 and the auxiliary shaft 41 depicted in FIGS. 4 and 5a, each auxiliary disc 67 bears on the relevant pinching discs 21a, 21b (see FIGS. 5a and 5b), so that the pinching discs 21a, 21b are taken along by the rotation of the auxiliary discs 67. A speed difference between the pinching discs 21a, 21b and the pinching discs 19 is present during this, which difference is determined by the number of teeth of the gearwheels 57 and 59 and by the diameter ratio between the auxiliary discs 67 and the pinching discs 21a, 21b.

Figure 5A:
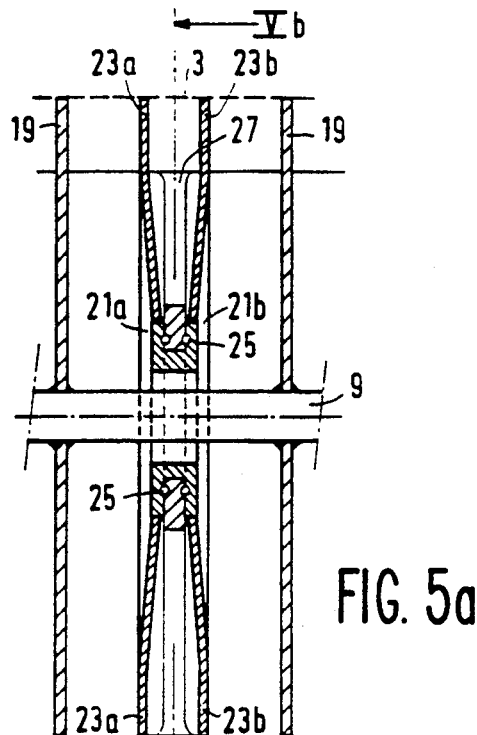
FIG. 5a is a detailed cross-section of a few pinching discs and an auxiliary disc of the depilation apparatus of FIG. 4.
Figure 5B:
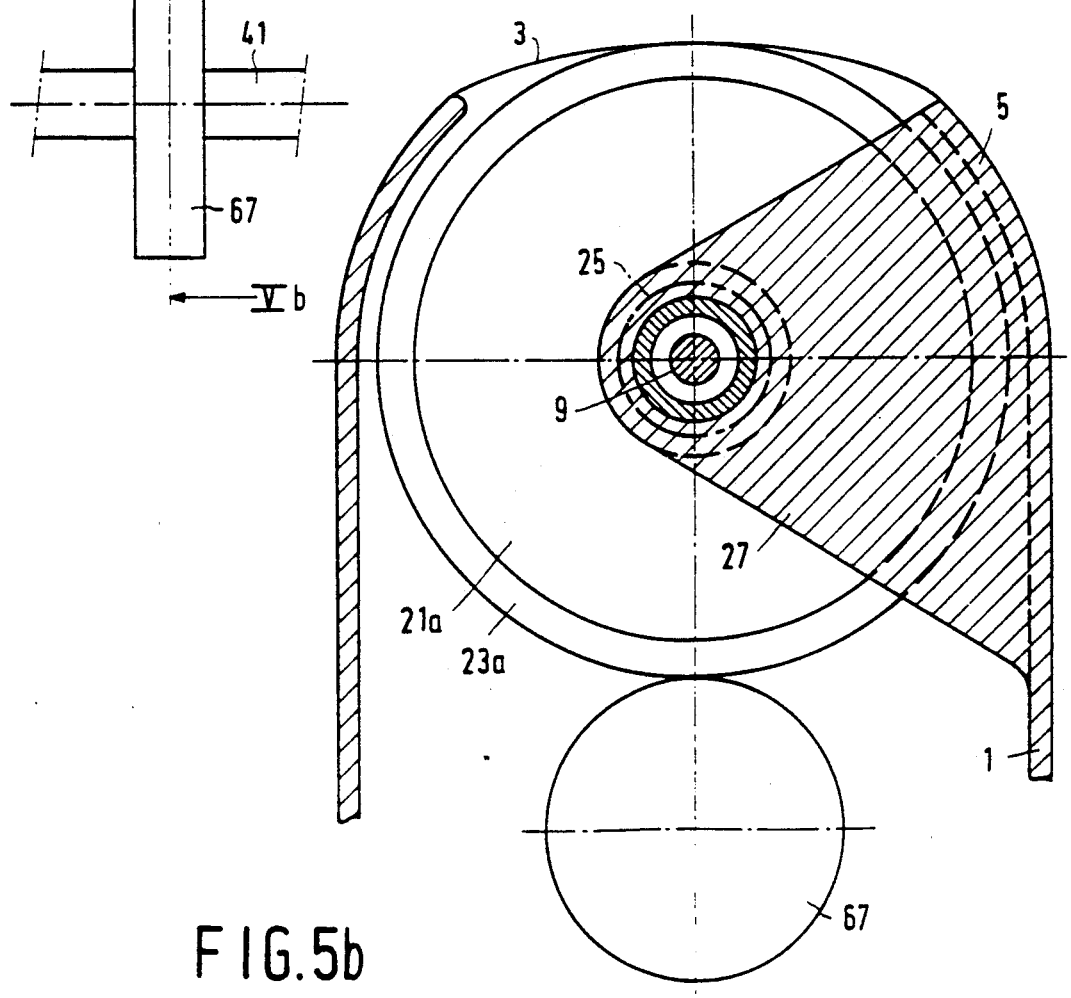
FIG. 5b is a cross-section of the depilation apparatus taken on the line Vb—Vb in FIG. 5a, FIGS. 6a and 6b diagrammatically show the pinching position of a few pinching discs of the depilation apparatus of FIG. 4.

In the central position of the drive shaft 9 and the auxiliary shaft 41 depicted in FIGS. 4 and 5a, the pinching discs 19, 21a, 21b are in the catching position and hairs present in the depilation opening 3 can enter between the pinching discs. Upon a further rotation and translation of the drive shaft 9 and the auxiliary shaft 41 starting from the central position, the pinching discs 19 come into contact with the pinching surfaces 23a of the pinching discs 21a, after which a pinching force is built up between the pinching discs 19 and the pinching surfaces 23a under elastic deformation of the pinching discs 21a. The width $B_2$ of the auxiliary discs 67 indicated in FIG. 4 is such that the auxiliary discs 67 still bear on the pinching discs 21b at the moment at which the pinching discs 19 come into contact with the pinching discs 21a, so that at that moment the speed difference between the pinching discs 19 and 21a is maintained (see FIG. 6a). The auxiliary discs 67 do not clear the pinching discs 21b until the pinching force between the pinching discs 19 and 21a has already been partly built up (see FIG. 6b). It is achieved in this way that the speed difference between the pinching discs 19 and 21a is maintained in the pinching position for a predetermined time duration, so that the number of times the hairs clamped between the pinching discs 19 and the pinching surfaces 23a are twisted about their longitudinal axes is accurately determined. The moment the auxiliary discs 67 become clear of the pinching discs 21b, the pinching discs 21a, 21b are taken along by the rotation of the pinching discs 19, upon which the pinching force reaches a maximum value and the twisted hairs are pulled from the skin by the rotation of the drive shaft 9. The auxiliary discs 67 come into contact again with the pinching discs 21b before the pinching discs 21a clear the pinching discs 19. Then the drive shaft 9 and the auxiliary shaft 41 enter the central position again, after which the process described above is repeated when the pinching discs 19 subsequently come into contact with the pinching discs 21b.

In the second embodiment of the depilation apparatus described above, the number of times the hairs are twisted about their longitudinal axes is determined by the width $B_2$ of the auxiliary discs 67 and the speed difference between the pinching discs 19 and 21a, 21b, so that the number of times the hairs are twisted about their longitudinal axes can be optimized in the design stage of the depilation apparatus through a favorable choice of the width $B_2$ and the said speed difference. It is furthermore apparent from the above that the means for twisting the hairs comprise the auxiliary shaft 41 with the auxiliary discs 67 in addition to the depilation member 7 in the second embodiment.

Figure 7:
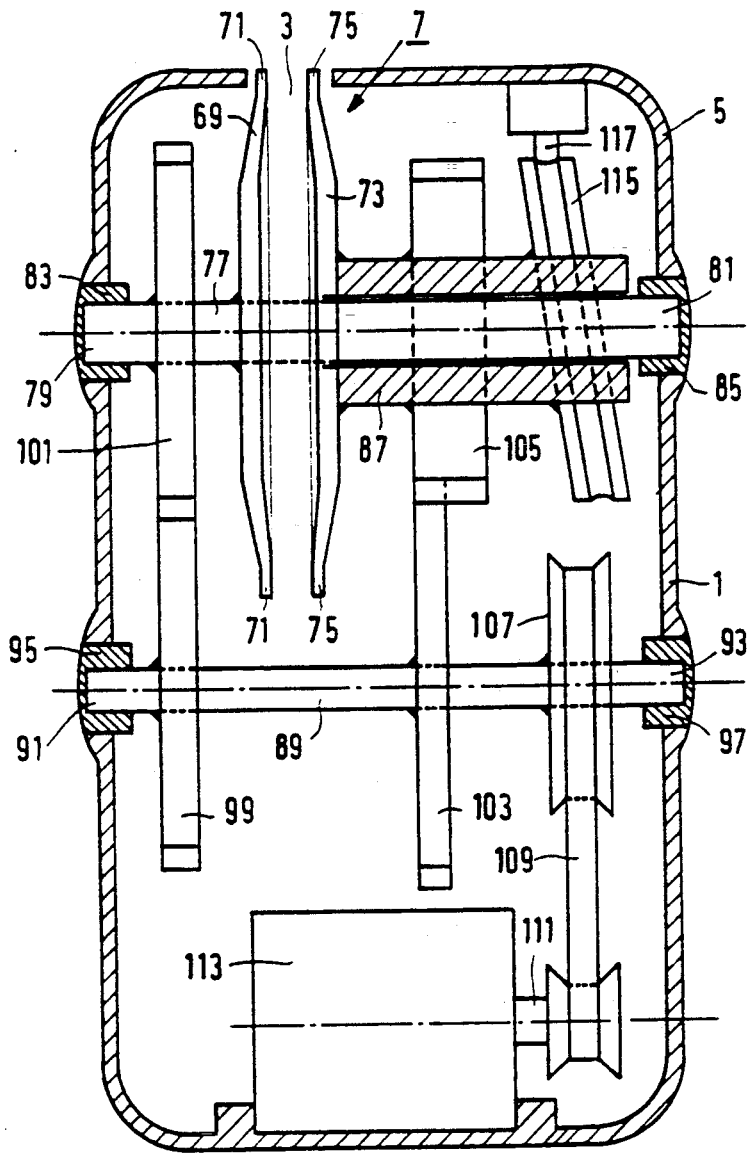
FIG. 7 shows a third embodiment of a depilation apparatus according to the invention, partly in side elevation and partly in cross-section.

The third embodiment of the depilation apparatus according to the invention shown in FIG. 7 is also provided with a housing 1 and a depilation opening 3 provided in a depilation head 5 of the housing 1. The skin is exposed to a depilation member 7 through the depilation opening 3, which member is provided with a first, rigid metal pinching disc 69 with an annular pinching surface 71 and a second metal pinching disc 73 which is flexible in axial direction and has an annular pinching surface 75. The first pinching disc 69 is fastened on a first metal drive shaft 77 which is rotatably supported with journals 79 and 81 in bearing bushes 83 and 85 of the depilation head 5. The second pinching disc 73 is fastened on a second, hollow metal drive shaft 87 which is provided concentrically about the first drive shaft 77. The second drive shaft 87 is rotatable about and movable in axial direction along the first drive shaft 77.

The depilation head 5 further comprises an auxiliary shaft 89 which is rotatably supported with journals 91 and 93 in bearing bushes 95 and 97 of the depilation head 5. The auxiliary shaft 89 carries next to one another a first gearwheel 99, which is in engagement with a gearwheel 101 of the first drive shaft 77, a second gearwheel 103 which is in engagement with a gearwheel 105 of the second drive shaft 87, and a drive pulley 107 which is coupled to an output shaft 111 of an electric motor 113 via a belt 109. The transmission ratios between the gearwheels 99, 101, 103 and 105 are such that the first and second pinching discs 69 and 73 are driven with different rotation speeds by the electric motor 113 during operation.

A guide disc 115 is furthermore fastened on the second drive shaft 87, arranged obliquely relative to the second drive shaft 87. The guide disc 115 is in engagement with a guide pin 117 fastened to the depilation head 5. Owing to the use of the guide disc 115 and the guide pin 117, the second drive shaft 87 performs a combined rotary and translatory movement by which the second pinching disc 73 is displaced in axial direction relative to the first pinching disc 69 between a catching position, in which a hair trapping slot is present between the pinching discs 69 and 73, and a pinching position, in which the pinching discs 69 and 73 exert a pinching force on one another through the pinching surfaces 71 and 75 under elastic deformation of the second pinching disc 73.

In the depilation apparatus shown in FIG. 7, a permanent speed difference obtains between the pinching discs 69 and 73 during operation. The hairs which enter between the pinching surfaces 71 and 75 through the depilation opening in the catching position of the pinching discs 69 and 73 are twisted between the pinching surfaces 71 and 75 after these have reached the pinching position and then pulled from the skin while the twisting continues. It is noted that the speed difference between the pinching discs 69 and 73 need not be particularly great. Assuming an average hair diameter of approximately 0.1 mm, a mutual shifting of the pinching surfaces 71 and 75 of 1 to 2 mm in the pinching position is already sufficient for twisting the hairs a few times completely about their longitudinal axes. An optimum speed difference between the pinching discs 69 and 73 may be achieved in a simple manner through a favorable choice of the transmission ratios between the gearwheels 99, 101, 103 and 105. Since the speed difference between the pinching discs 69 and 73 required in the pinching position is only small, wear of the pinching surfaces 71 and 75, which can arise during stationary operation of the depilation apparatus while no hairs enter between th pinching surfaces 71 and 75, remains limited.

In the depilation apparatus shown in FIG. 7, a permanent speed difference between the pinching discs 69 and 73 is achieved in that the two pinching discs 69 and 73 are driven at different rotation speeds. The fourth embodiment of the depilation apparatus according to the invention shown in FIGS. 8 and 9 also comprises two pinching discs with continuously differing rotation speeds, as will become apparent below. In this embodiment, however, only one of the two pinching discs is driven, while the other pinching disc is carried along by the rotation of the driven pinching disc.

Figure 8:
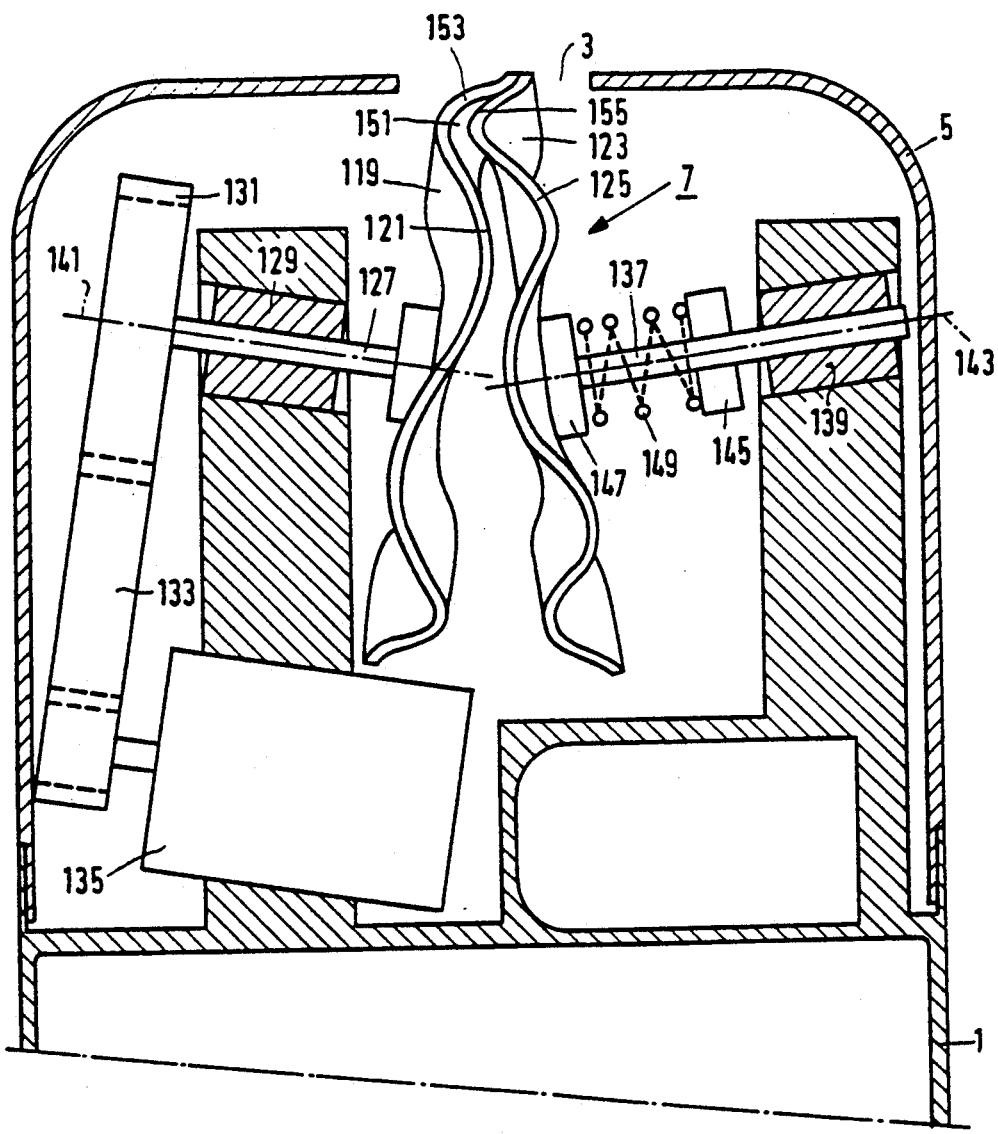
FIG. 8 shows a fourth embodiment of a depilation apparatus according to the invention, partly in side elevation and partly in cross-section.

Like the depilation apparatus described above, the depilation apparatus shown in FIGS. 8 and 9 comprises a housing 1 with a depilation opening 3 provided in a depilation head 5 of the housing 1 and affording access to a depilation member 7. The depilation member 7 is provided with a first, rigid metal pinching disc 119 having a pinching surface 121 extending along a circumference of the pinching disc 119, and a second, rigid metal pinching disc 123 having a pinching surface 125 extending along a circumference of the pinching disc 123. The pinching discs 119 and 123 have the same diameter, while the pinching surfaces 121 and 125 face one another. The first pinching disc 119 is fastened on a metal drive shaft 127 which has its rotation bearings in a bearing bush 129 of the housing 1. The drive shaft 127 is positioned at an angle of approximately 10° relative to the depilation opening 3 and is provided with a geared pulley 131 driven by an electric motor 135 positioned inside the housing 1 via a toothed belt 133. As FIG. 8 shows, the second pinching disc 123 is provided on a bearing shaft 137 which has its rotation bearings in a bearing bush 139 of the housing 1 and which is positioned at an angle of approximately 10° relative to the depilation opening 3, as is the drive shaft 127. The pinching discs 119 and 123 thus have non-coaxial axes of rotation 141 and 143. The second pinching disc 123 is movable in axial direction along the bearing shaft 137, which is provided with means (not visible in FIGS. 8 and 9) by which the second pinching disc 123 is locked in the direction of rotation relative to the bearing shaft 137. A helical spring 149 is provided around the bearing shaft 137 between a flange 145 fastened to the bearing shaft 137 and a collar 147 of the second pinching disc 123, which spring presses the second pinching disc 123 against the first pinching disc 119, so that the pinching surfaces 121 and 125 exert a pinching force on one another near the depilation opening 3.

Figure 9:
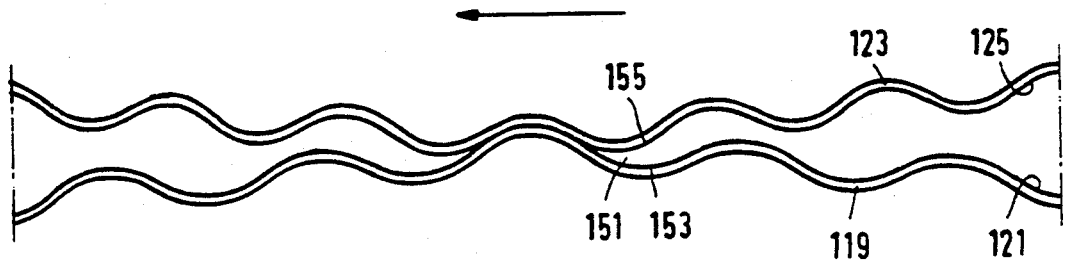
FIG. 9 is a cross-section of the cooperating pinching surfaces of two pinching discs of the depilation apparatus of FIG. 8, taken in circumferential direction along the edges of the two pinching discs.

As is shown in FIGS. 8 and 9, the pinching surfaces 121 and 125 are provided with surfaces which undulate in circumferential direction and through which the pinching discs 119 and 123 are in engagement with one another under the influence of the mechanical helical spring 149. The number of undulations of the first pinching disc 119 is five, whereas the number of undulations of the second pinching disc 123 is six. Owing to the difference between the numbers of undulations of the first pinching disc 119 and the second pinching disc 123, the second pinching disc 123 has a smaller rotation speed than the first pinching disc 119 during operation.

It can be seen in FIGS. 8 and 9 that a hair trapping slot is present between the two pinching discs 119 and 123 over part of the depilation opening 3, in which slot hairs present in the depilation opening 3 can enter. The said hair trapping slot is formed, as is shown in detail in FIG. 9, by the space 151 present between the pinching surface portion 153 of the pinching disc 119 and the pinching surface portion 155 of the pinching disc 123, which is substantially parallel to the pinching surface portion 153. Starting from the position of the pinching discs 119 and 123 depicted in FIG. 9, the pinching surface portions 153 and 155 come into mutual contact upon a further rotation of the pinching discs 119 and 123 in the direction indicated in FIG. 9, whereby hairs present between the pinching surface portions 153 and 155 are held clamped in and are twisted about their longitudinal axes under the influence of the speed difference between the pinching discs 119 and 123. Subsequently, the hairs are pulled from the skin by the rotation of the pinching discs 119 and 123.

In the depilation apparatus of FIGS. 8 and 9, the number of times the hairs are twisted about their longitudinal axes is determined inter alia by the number of undulations of the two pinching surfaces 121 and 125, a speed difference being created between the two pinching discs 119 and 123 which is sufficient for twisting the hairs five times completely about their longitudinal axes when the difference between the numbers of undulations of the two pinching surfaces 121 and 125 is one. An advantage of the depilation apparatus is, moreover, that the depilation apparatus is effectively operative several times during one full revolution of the pinching discs 119, 123, because the parallel pinching surface portions 153 and 155 of each pair of cooperating undulations passing the depilation opening 3 take part in the depilation process.

It is noted that the means present for twisting the hairs are integrated with the depilation member 7 in the first, third and fourth embodiments of the depilation apparatus as discussed above. The invention, however, is not limited to depilation apparatus in which the depilation member 7 comprises the means for twisting the hairs. Thus, the second embodiment of the depilation apparatus discussed above comprises, besides the depilation member 7 with the pinching elements 19, 21a and 21b, further means for twisting the hairs (auxiliary shaft 41 with auxiliary discs 67). Furthermore, the twisting and depilatory functions of the depilation apparatus may alternatively be completely separated in that the depilation apparatus is provided with a separate twisting member in addition to the depilation member, and with a mechanical coupling for coupling the functions of the twisting member and the depilation member to one another. This, however, in general leads to a complicated construction of the depilation apparatus.

The hairs are preferably twisted at least five times fully about their longitudinal axes by the depilation apparatus in order to achieve an optimum reduction of the required pulling force. It is noted that, also if the hairs are twisted fewer times, a major reduction of the pulling force and a reduction of the occurring pain is already established. It is further noted that an increase in the tensional strength of the hairs in the pulling direction is found to result if the hairs are twisted five or more times about their longitudinal axes. The risk of hair fracture during pulling out of the hairs is further reduced as a result of this increase.

It is also noted that the pinching elements in the embodiments described above are formed by pinching discs. The invention, however, is not limited to depilation apparatuses having disc-shaped pinching elements, but in general also covers depilation apparatuses provided with cooperating pinching elements of a different kind, such as, for example, disc-shaped pinching elements having windows, or pinching elements as disclosed in French Patent 667,265. Furthermore, the invention may also be applied to depilation apparatus provided with pivotable pinching discs instead of axially shifting pinching discs. With the former kind of depilation apparatus, however, a more complicated construction of the drive of the pinching discs will generally have to be used.

It is further noted that in the second embodiment of the depilation apparatus, instead of the axially displaceable auxiliary discs 67, auxiliary discs may alternatively be used which are displaceable transverse to the drive shaft 9. This may be achieved, for example, in that the auxiliary discs 67 are provided eccentrically relative to the auxiliary shaft 41.

Finally, it is noted that the depilation apparatus according to the third and fourth embodiments each comprise only two pinching discs. Generally, it is technically far from simple in these depilation apparatuses to add to the number of discs in axial direction. It is possible, however, in these depilation apparatuses to arrange a number of identical depilation members 7 next to one another.

What is claimed is:

1. A depilation apparatus provided with a depilation member having pinching elements for consecutively holding hairs which grow from the skin clamped in and pulling said hairs from the skin, wherein the depilation apparatus is provided with means for twisting the hairs about their longitudinal axes before the depilation member pulls the hairs from the skin, said pinching elements being rotatable relative to a housing and, being displaceable from a catching to a pinching position; and wherein said means for twisting the hairs comprises a depilation member having at least one of the group of (i) means for effecting different rotation speeds of the pinching elements at least temporarily while in the pinching position, (ii) means for effecting slideable movement of pinching surfaces of said pinching elements relative to one another in the pinching position, and (iii) means for effecting flexibility in the axial direction in at least one of the pinching elements while in the pinching position.

2. A depilation apparatus as claimed in claim 1, wherein the means for twisting the hairs twist the hairs at least five times fully about their longitudinal axes before the depilation member pulls the hairs from the skin.

3. A depilation apparatus as claimed in claim 1, wherein the depilation member comprises the means for twisting the hairs.

4. A depilation apparatus as claimed in claim 3, in which the depilation member comprises at least two pinching elements which are mutually displaceable from a catching position, in which a pinching surface of one of the pinching elements is at a distance from a pinching surface of the other pinching element, into a pinching position, in which the pinching elements exert a pinching force on one another through the pinching surfaces, and wherein the pinching surfaces of the pinching elements are slidable alongside one another in the pinching position.

5. A depilation apparatus as claimed in claim 4, in which the pinching elements are formed by pinching discs which are rotatable relative to a housing, and wherein the two pinching discs have non-coaxial rotation axes and are in engagement with one another by means of surfaces which are undulated in circumferential direction, having different numbers of undulations, while one of the two pinching discs can be driven.

6. A depilation apparatus claimed in claim 5, wherein one of the two pinching discs has only one undulation more than the other pinching disc.

7. A depilation apparatus as claimed in claim 1, in which the depilation member comprises at least two disc-shaped pinching elements which are rotatable relative to a housing, which extend transverse to a depilation opening of the housing, and which are mutually displaceable from a catching position, in which a pinching surface of one of the pinching elements lies at a distance from a pinching surface of the other pinching element, into a pinching position, in which the pinching elements exert a pinching force on one another through the pinching surfaces, and wherein one of the pinching elements is fastened on a drive shaft which is rotatably journalled relative to the housing and is shiftable in axial direction, while the other pinching element is journalled so as to be freely rotatable relative to the housing, the means for twisting the hairs comprising an auxiliary disc which can be driven, which is arranged parallel to the disc-shaped pinching elements, and which is displaceable relative to the freely rotatable pinching element and temporarily bears on the freely rotatable pinching element in the pinching position of the pinching elements.

8. A depilation apparatus as claimed in claim 7, wherein the auxiliary disc is fastened on an auxiliary shaft which is directed parallel to the drive shaft and is shiftable in axial direction in synchronity with the drive shaft.

9. A depilation apparatus as claimed in claim 2, wherein the depilation member comprises the means for twisting the hairs.

10. A depilation apparatus as claimed in claim 2, wherein the depilation member comprises at least two disc-shaped pinching elements which are rotatable relative to a housing, which extend transverse to a depilation opening of the housing, and which are mutually displaceable from a catching position, in which a pinching surface of one of the pinching elements lies at a distance from a pinching surface of the other pinching element, into a pinching position, in which the pinching elements exert a pinching force on one another through the pinching surfaces, characterized in that one of the pinching elements is fastened on a drive shaft which is rotatably journalled relative to the housing and is shiftable in axial direction, while the other pinching element is journalled so as to be freely rotatable relative to the housing, the means for twisting the hairs comprising an auxiliary disc which can be driven, which is arranged parallel to the disc-shaped pinching elements, and which is displaceable relative to the freely rotatable pinching element and temporarily bears on the freely rotatable pinching element in the pinching position of the pinching elements.

11. A depilation apparatus provided with a depilation member having pinching elements for consecutively holding hairs which grow from the skin clamped in and pulling said hairs from the skin, the depilation apparatus being provided with means for twisting the hairs about their longitudinal axes before the depilation member pulls the hairs from the skin, wherein the depilation member comprises at least two disc-shaped pinching elements which are rotatable relative to a housing, which extend transverse to a depilation opening of the housing, and which are displaceable from a catching position, in which a pinching surface of one of the pinching elements is at a distance from a pinching surface of the other pinching element, into a pinching position, in which the pinching elements exert a pinching force on one another through the pinching surfaces, and wherein said means for twisting the hairs comprises a depilation member wherein the pinching elements have different rotation speeds at least temporarily while in the pinching position and the pinching surfaces of the pinching elements are slideable alongside one another in the pinching position.

12. A depilation apparatus as claimed in claim 11, wherein one of the pinching elements is fastened on a drive shaft which is journalled so as to be rotatable relative to the housing and which is shiftable in axial direction, while the other pinching element is journalled so as to be freely rotatable relative to the housing.

13. A depilation apparatus as claimed in claim 12, wherein the pinching element journalled so as to be freely rotatable relative to the housing is cup-shaped and is elastically deformable in axial direction.

14. A depilation apparatus as claimed in claim 11, wherein one of the pinching elements is fastened on a first drive shaft, while the other pinching element is fastened on a second drive shaft which is arranged coaxially with the first drive shaft, one of the two drive shafts being shiftable in axial direction, while the drive shafts can be driven at different speeds.

15. A depilation apparatus as claimed in claim 14, wherein the two drive shafts can be driven by means of only one electric motor.

16. A depilation apparatus provided with a depilation member having pinching elements for consecutively holding hairs which grow from the skin clamped in and pulling said hairs from the skin, the depilation apparatus being provided with means for twisting the hairs about their longitudinal axes before the depilation member pulls the hairs from the skin, wherein the depilation member comprises at least two disc-shaped pinching elements which are rotatable relative to a housing, which extend transverse to a depilation opening of the housing, and which are displaceable from a catching position, in which a pinching surface of one of the pinching elements is at a distance from a pinching surface of the other pinching element, into a pinching position, in which the pinching elements exert a pinching force on one another through the pinching surfaces, and wherein said means for twisting the hairs comprises a depilation member wherein the pinching elements have different rotation speeds at least temporarily while in the pinching position and the pinching surfaces of the pinching elements are slideable alongside one another in the pinching position, and wherein the two pinching discs have non-coaxial rotation axes and are in engagement with one another by means of surfaces which are undulated in circumferential direction, having different numbers of undulations, while one of the two pinching discs can be driven.

17. A depilation apparatus provided with a depilation member having pinching elements for consecutively holding hairs which grow from the skin clamped in and pulling said hairs from the skin, the depilation apparatus being provided with means for twisting the hairs about their longitudinal axes before the depilation member pulls the hairs from the skin, wherein the depilation member comprises at least two disc-shaped pinching elements which are rotatable relative to a housing, which extend transverse to a depilation opening of the housing, and which are displaceable from a catching position, in which a pinching surface of one of the pinching elements is at a distance from a pinching surface of the other pinching element, into a pinching position, in which the pinching elements exert a pinching force on one another through the pinching surfaces, wherein one of the pinching elements is fastened on a drive shaft which is rotatably journalled relative to the housing and is shiftable in axial direction, while the other pinching element is journalled so as to be freely rotatable relative to the housing, and wherein said means for twisting the hairs comprises a depilation member wherein the pinching elements have different rotation speeds at least temporarily while in the pinching position obtained by an auxiliary disc which can be driven, which is arranged parallel to the disc-shaped pinching elements, and which is displaceable relative to the freely rotatable pinching element and temporarily bears on the freely rotatable pinching element in the pinching position of the pinching elements.

* * * * *